United States Patent

Horney, II et al.

Patent Number: 5,581,558
Date of Patent: Dec. 3, 1996

[54] APPARATUS FOR BRIDGING NON-COMPATIBLE NETWORK ARCHITECTURES

[75] Inventors: Lee F. Horney, II; Allan W. Laird; Gerald L. McKenna; Dany M. Zeidan, all of Monmouth, N.J.

[73] Assignee: Lucent Technologies Inc., Murray Hill, N.J.

[21] Appl. No.: 412,822

[22] Filed: Mar. 29, 1995

[51] Int. Cl.⁶ ............................. H04J 3/02; H04L 12/46
[52] U.S. Cl. .................. 370/401; 370/466; 395/200.02; 395/500
[58] Field of Search ........................... 370/60, 60.1, 61, 370/79, 85.13, 85.14, 94.1, 94.2, 94.3, 110.1; 395/200, 275, 325, 500, 650

[56] References Cited

U.S. PATENT DOCUMENTS

| | | | |
|---|---|---|---|
| 4,901,312 | 2/1990 | Hui et al. | 370/85.14 |
| 4,975,906 | 12/1990 | Takiyasu et al. | 370/85.13 |
| 5,144,622 | 9/1992 | Takiyasu et al. | 370/85.13 |
| 5,159,594 | 10/1992 | Bales et al. | 370/110.1 |
| 5,182,751 | 1/1993 | Bales et al. | 370/110.1 |
| 5,185,742 | 2/1993 | Bales et al. | 370/110.1 |
| 5,195,090 | 3/1993 | Bolliger et al. | 370/94.1 |
| 5,229,994 | 7/1993 | Balzano et al. | 370/79 |
| 5,293,379 | 3/1994 | Carr | 370/94.1 |
| 5,361,259 | 11/1994 | Hunt et al. | 370/85.13 |
| 5,432,907 | 7/1995 | Picazo, Jr. et al. | 395/200.02 |
| 5,446,736 | 8/1995 | Gleeson et al. | 370/85.13 |
| 5,448,566 | 9/1995 | Richter et al. | 370/85.13 |

Primary Examiner—Alpus H. Hsu

[57] ABSTRACT

A bridging apparatus facilitates communication between processors across networks having incompatible protocols and linking the processors. The bridging apparatus interfaces each processor to a respective incompatible network, and processes data in two-way communication across the interfaces for conversion from one incompatible protocol to another.

25 Claims, 5 Drawing Sheets

APPARATUS FOR BRIDGING NON-COMPATIBLE NETWORK ARCHITECTURES

BACKGROUND OF THE INVENTION

1. Field of the Invention

The present invention relates to internetwork data transfer and, more particularly, to apparatus for bridging data across a non-compatible network interface and a system which implements the same.

2. Description of the Related Art

Various communication media provide channels or paths which link various data processing equipment. Communication media or networks that share a common communication channel are sometimes referred to as shared-channel networks or multi-access media. Within multi-access media, signals launched to/received from any one station (e.g., a data processor) may be directed to or received from a variety of other stations or processors within the network. Examples of muiti-access media are local area networks (LANs), wide area networks (WANs), metropolitan area networks (MANs), satellite networks and packet radio networks, etc.

Local area networks (LANs) provide a communication medium that is shared among a plurality of attached stations, e.g., microcomputers, office machines, etc. Local area networks utilize what is commonly referred to as a "layered" protocol to transmit data blocks on a local shared bus. The data are transmitted with explicit addresses that are recognized by the destination station for delivery. A StarLan local area network is an example of a widely used local area network which utilizes a distributed (or medium access) protocol to regulate station or processor access to the common transmission medium (i.e., the local area network bus). A set of cooperating adapters attaches each station to the local area network (i.e., a local area network interface). Through the adapters, the appropriate "layered" protocol is provided to access the network, to buffer data for exchange and to physically interface with other LAN-resident stations.

Wide area networks (WANs) define an extended or wide transmission architecture for communicating, for example, nationally or internationally. As with local area networks, wide area networks utilize a layered protocol to accomplish network communication over a shared medium. FIG. 1 illustrates a common, layered, wide area network architecture based on the well known open systems interconnection (OSI) model. The illustration of FIG. 1 exemplifies a logical connection between data applications X and Y with one intermediate node. The layers at each station (i.e., data application) are arranged in a hierarchical configuration, in which the lower layers (i.e., network, data link and physical layers) function to provide a physical connection between users or processes, and the upper layers (i.e., application, presentation, session and transport layers) provide actual data exchange between processes and/or users.

(X.25) designates the most widely currently used wide area network standard, the protocol of which is based on the Comité Consultatif Internationale Télégraphique et Téléphonique (CCITT) definition of the lower three layers of the OSI model. The (X.25) protocol regulates access and connection of data terminals, computers and other equipment, i.e., data terminal equipment (DTE), to the packet-switched WAN via data communication equipment (DCE). The (X.25) packet layer (i.e., the network layer of the OSI model) essentially provides a virtual circuit between processes across the wide area network. FIG. 2 shows an (X.25) WAN with a direct connection from data terminal equipment A to data terminal equipment B, and a direct connection from data terminal equipment A to data terminal equipment C. Data transmitted to/from data terminal equipment across the (X.25) WAN must be arranged with the (X.25) WAN protocol.

While communication between data terminals interconnected within a local area network (LAN) or within a wide area network (WAN) is extremely useful, the differing local area network and wide area network protocol prohibit LAN/WAN communication without some type of interface. In other words, data formed within LAN-resident equipment is not readily interpreted by a wide area network controller. To communicate across a wide area network, LAN-resident equipment must utilize some type of bridge or packet assembler/disassembler (PAD) to translate local area network data to the wide area network format and back. For example, dedicated diagnostic equipment designed to communicate with a target processor co-resident within a first local area network is unable to communicate with a second target processor resident within a second separate local area network, i.e., across a communication medium connecting the first and second local area networks, without some type of bridging or interface means.

Therefore, a need exists for apparatus which can bridge or link, for example, a dedicated diagnostic, LAN-resident processor, to a LAN-resident target processor across a non LAN-compatible wide area network. More particularly, a need exists for an interface or bridging apparatus which can adjust data transferred from/to a first LAN-resident processor to/from a second LAN-resident processor (compatible with the first) across a wide area network (WAN) while preserving a local area network interface with each of the first and second LAN-resident processors.

SUMMARY OF THE INVENTION

The present invention provides a bridging apparatus to bridge data across an interface between non-compatible network architectures, and in particular, to bridge data to/from a local area network (LAN) and from/to an asynchronous data source across an interface between the local area network and a wide area network (WAN). Accordingly, both packet assembler/disassembler (PAD) and bridge functionality are combined in a single apparatus to provide a wide area network data communication bridge.

The bridging apparatus includes a processor for processing data arriving at the apparatus for passage through the interface in accordance with a set of instructions stored within a memory. Also included are a first port for transferring the data to/from a local area network, a second port for transferring the data to/from a node of a wide area network and a third port for asynchronously transferring the data to/from a port of a local apparatus for transfer to/from the wide and local area networks. The bridging apparatus preferably includes at least one configuration switch to define apparatus operation such that the apparatus simulates either data terminal equipment or data communication equipment.

The present invention also provides a system that includes a first bridging apparatus for bridging data directed to/from a first station or processor resident within a local area network across its interface with a non-compatible wide area network. WAN-resident data are transferred in both directions from/to a second LAN-resident station or processor. The second LAN-resident station is linked to the wide area network via a second bridging apparatus for bridging the WAN/LAN interface. The hardware comprising each first and second bridging apparatus defines an internal architecture which may be formed and driven by discrete or integrated electronic components, or may be microprocessor-based and software (or firmware) driven. The bridging apparatus preferably terminates three separate connections, a 1 Mb (StarLAN) local area network connection, which is an AT&T CORPORATION IEEE 802.3 Carrier Sense Multiple Access with Collision Detection (CSMA/CD) LAN protocol, an (X.25) WAN connection and an asynchronous connection. The asynchronous connection may be used both as a local control port for the first and second bridging apparatus as well as an asynchronous gateway to the local and wide area networks.

The present invention also provides a method for establishing a data communication system to bridge data directed from/to a first LAN-resident station to/from a second LAN-resident station across a network that is non-compatible with the first LAN-resident station. A wide area network (WAN) is an example of such a non-compatible network. The method may be initiated, for example, when the first LAN-resident station or processor generates and transmits a data packet adapting either an IEEE 802.3 broadcast address or individual PC address of a first bridging apparatus. The first bridging apparatus receives the data and arranges the data's protocol or format to ensure compatible transmission across a LAN/WAN interface into the wide area network. A second bridging apparatus receives and transforms the protocol or data format of the WAN-arranged data for transfer across a second interface (i.e., WAN/LAN) to the second local area network. The protocol of the first and second local area networks is preferably compatible. To the LAN-resident first and second stations, communication appears to take place within a single local area network shared by both.

The bridging function provided by the apparatus described herein is ideal in which first and second stations normally communicate via a shared, local area network, but one or the other of the stations is outside the reach of the local area network. Due to conventional limitations, the second station would need to be transported to a fixed location for physical access to the local area network and, therefore, the first station. The bridging apparatus of this invention obviates the need to physically connect separate first and second stations (within first and second local area networks) to establish communication therebetween. If the first station operation is vital or its down time is expensive, expedited access by the first station to the second LAN-resident station is essential for effective system operation. For example, a diagnostic and repair (i.e., maintenance) source processor designed to communicate directly over a local area network to maintain a target processor, also resident within a local area network, could easily be bridged across a wide area network by the bridging apparatus described herein, increasing network reliability.

DETAILED DESCRIPTION OF PREFERRED EMBODIMENTS

Figure 1:
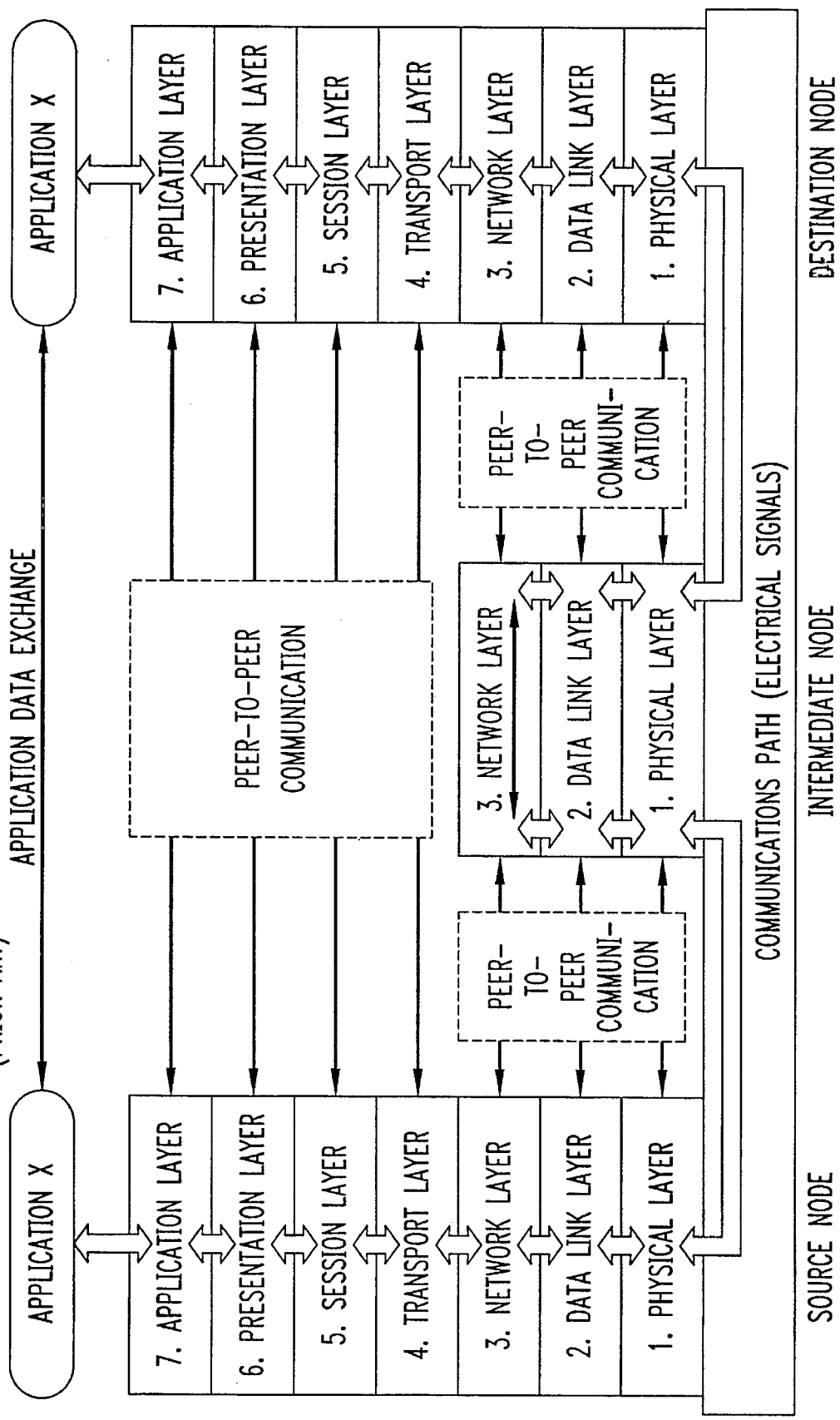
FIG. 1 is a block diagram of a layered protocol model of communication between two processes.
Figure 2:
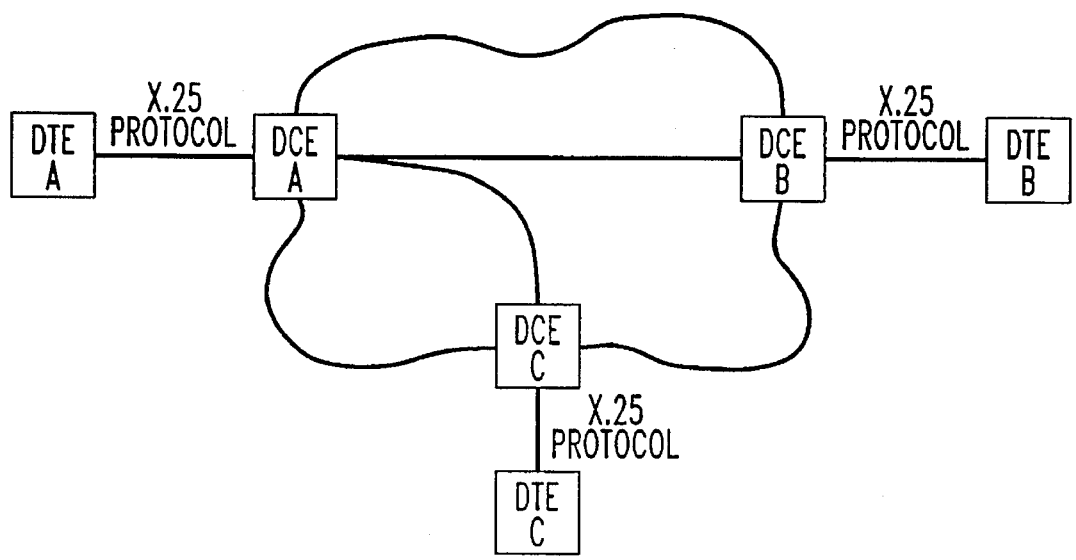
FIG. 2 is a schematic flow diagram of an X.25™ wide area network.

The present invention provides a bridging apparatus which enables communication between host processing terminals across a wide area network in which the protocol of the wide area network is not compatible with the protocol utilized by the host processing terminals. The host processing terminals preferably comprise first and second processors, each processor being resident within separate first and second local area networks (LANs). Preferably, the first and second local area networks are compatible. The bridging apparatus link the processors to nodes of the wide area network. Each bridging apparatus interprets and translates LAN-originated data directed into the wide area network, and WAN-originated data directed from the wide area network to the local area network such that the data is smoothly interfaced therebetween. The first and second processors may be referred to interchangeably herein as source and target terminals or first and second stations.

The bridging apparatus of this invention provides packet assembler/disassembler and bridging functionality for linking source and target terminals across a wide area network in which the terminals would normally be linked within a shared, local area network. The bridging apparatus may be hardware, software or firmware driven. The need for such apparatus is illustrated by the following example. Certain LAN-resident source processors are used to maintain LAN-resident target processors by physically attaching the two processors to the same LAN. This typically requires physically transporting one to the other. As the number of target processors (or second stations) maintained and outside the reach of the source processor increases, the task of providing access by the dedicated source processor (diagnostic and repair equipment) to each target processor increases. Other expenses such as extended target terminal down time while waiting for access to a "shared" diagnostic or source terminal due to lack of long-distance access also tends to be quite unattractive. The bridging apparatus described herein provides remote access by the target to the source terminal across a communication medium such as a wide area network, obviating the need to physically transport the source to the target processor or vice versa.

The bridging apparatus of this invention uses a protocol bridge or controller at the LAN-WAN and WAN-LAN interface to link first a LAN-resident maintenance processor (source) across a wide area network to a second LAN-resident maintained processor (target). Such description of the invention, however, is for illustration purposes only, and is not meant to limit the scope of the invention. A preferred embodiment includes a system formed of first and second bridging apparatus referred to as DACSlink controllers, which are network controllers available from AT&T CORPORATION. Some (DACSlink) controllers are manufactured by AT&T CORPORATION of Holmdel, N.J. to provide interfaces between a (DACSmate) personal computer, which is a personal computer available from AT&T CORPORATION, (as source terminal) as a remote maintenance center that is resident within a local area network and an (X.25) WAN, and between a local area network-resident (DACS IV-2000) computer, which is a computer available from AT&T CORPORATION, (as target terminal) and an (X.25) WAN. The (DACSmate) PC (source terminal) typically performs fault analysis and maintenance on the (DACS IV-2000) computer (target terminal), both designed by AT&T CORPORATION, over the target's internal 1 Mb LAN.

The local area network link maximizes the (DACSmate) PC's ability to troubleshoot problems and effect repairs within the (DACS IV-2000) computer. Until this time, the (DACS IV-2000) computer had to be interfaced with the (DACSmate) PC when necessary, over the same LAN. Prior to the development of the (DACSlink) controller (i.e., bridging apparatus), remote diagnostic and repair of the (DACS IV-2000) computer across the (X.25) WAN would be impossible without local craft intervention. The current deployment of apparatus of this invention with the (DACSlink) controller enables personnel in a remote maintenance center to perform troubleshooting activities on any DACS frame connected to the network without traveling to the central office. In other words, a (DACSmate) PC no longer needs to be transported to an access node of the LAN in which the (DACS IV-2000) computer resides, or vice versa.

A bridging apparatus 200 of this invention will now be particularly described with reference to FIG. 3. Bridging apparatus 200 includes at least three ports P1, P2, and P3 for transferring data between a local area network, a wide area network and an asynchronous station, respectively, and housed within an apparatus housing 202. Port P1 is also connected to a level converter 204 for the transfer of data to/from the apparatus at signal levels that are correct for processing. Data are provided from/to level converter 204 to a local area network universal synchronous/asynchronous receiver/transmitter (USART) 206. Likewise, level converters 208, 210 adjust signal levels of data transferred from/to ports P2 and P3, respectively. Data are transferred to/from level converters 208, 210 to/from wide area network USART 212 and asynchronous USART 214, respectively. Receiver controller 216 and transmitter controller 218 control the transfer of data from/to the USARTS between a bus driver 220, an internal logic controller 222, address logic controller 224 and a bus receiver 226. The bus driver 220, controllers 222, 224 and bus receiver 226 control data directed data to/from the bus 228 to microprocessor 230. A set of instructions or programs stored within a read only memory (ROM) 234 control the sequence of commands carried out by microprocessor 230 on the apparatus' incoming/outgoing data.

Figure 4:
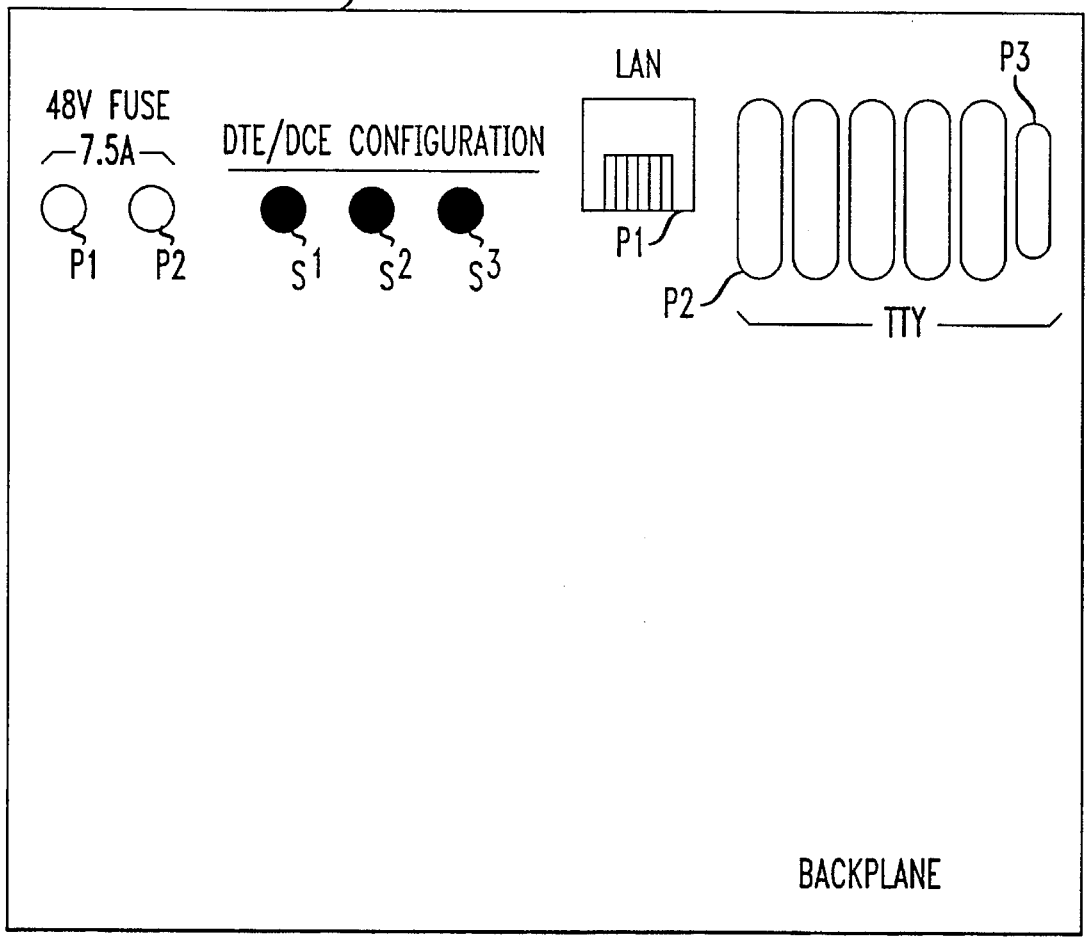
FIG. 4 is a plan view of a backplane of the apparatus shown in FIG. 3.
Figure 3:
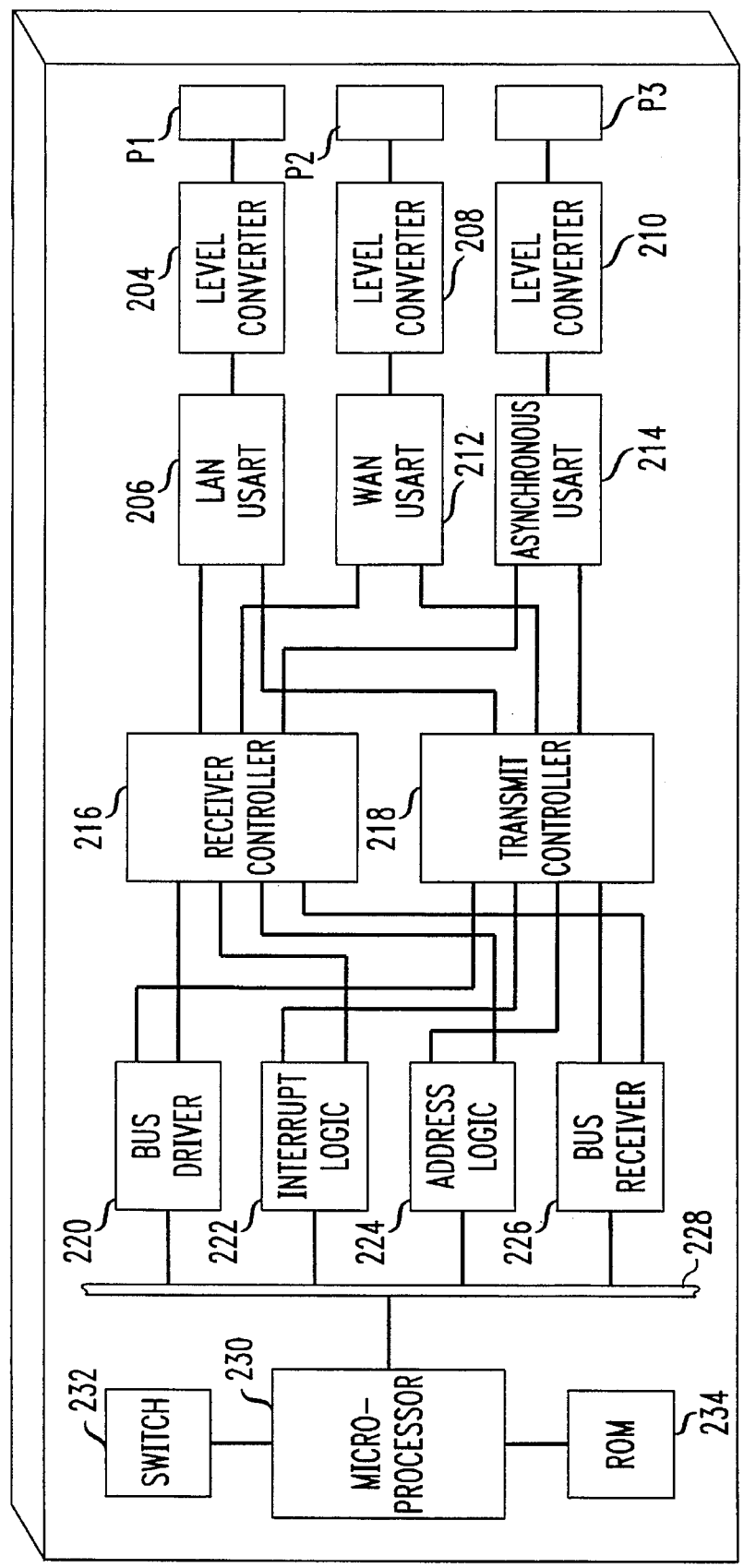
FIG. 3 is a schematic flow diagram of one embodiment of a bridging apparatus of this invention.

FIG. 4 shows one embodiment of a backplane which may be utilized with the bridging apparatus 200 shown in FIG. 3. The backplane 240 includes −48 Volt fuses F1 and F2 and DTE/DCE configuration switches S1, S2 and S3. Also shown in FIG. 4 is a local area network port P1, a first wide area network port P2 and an asynchronous port P3, each identified as teletype (TTY) connectors. Ports P2 and P3 embody filtered 37-pin and 25-pin D connectors, respectively. Also shown are four other filtered 37-pin connectors forming four other ports P4–P7.

It should be noted that the apparatus preferably includes an interface setup switch on either the front or backplane panels. The interface setup switch is a dual-in-line package switch which defines the switch settings for the remote maintenance center. One embodiment discloses six switches SW1, SW2, SW3, SW4, SW5 and SW6. $\overline{SW1}$ enables the controller local control port; SW2 disables the X.25 interface; $\overline{SW3}$ enables the layer 2 DTE; $\overline{SW4}$ bridges only controller generated packets (SW4 corresponds to promiscuous node whereby all LAN packets are bridged); $\overline{SW5}$ enables a 56 Kb X.25; and $\overline{SW6}$ enables a 56 Kb X.25.

In addition, under certain circumstances, the source or DACS-IV 2000 terminal may embody a flexible or control architecture which allows a piece of equipment (i.e., a maintenance processor such as the (DACSmate) controller) to be hooked into a group of machines resident within a local area network. The control hierarchy, while conventionally controlled by the physical arrangement, is extendable and remotable. In other words, a local area network may be embedded within the DACS frames, including an additional access node or nodes to extend the number of controllers accessibility. Equipment which is accessible to/by the LAN via the node virtually become part of the network. The node is extendable over the wide area network via the bridging apparatus of the invention.

Ports P1, P2 and P3 within the bridging apparatus 200 of this invention terminate three separate interfaces. The first is the local area network interface, the second is the wide area network interface and the third is the asynchronous interface. Operation of the three interfaces will be described below. For the reader's convenience, the three interfaces, a system definition and a firmware instruction-set definition will be discussed separately under five separate lettered headings.

A. The Local Area Network Interface

The bridging apparatus 200 terminates a local area network interface. Data must satisfy certain requirements to be transmitted across the interface from a source or target processor, e.g., IEEE 802.3/802.2 format. If the data are not in the correct format, they are discarded by the bridging apparatus. Frames of data generated within a source processor (110 of FIG. 5) that adopt the 802.3 broadcast address (0xffffffffffff)of the bridging apparatus 200, or the individual target processor address (0x000000000078), are captured by the bridging apparatus. Also, a promiscuous mode setting is available in which all LAN packets are bridged over the interface. The received packets are processed locally or transferred to the local area network if directed to the 802.2 destination service access point (DSAP at address 0x7A). If addressed otherwise, the data are directed across the wide area network (125 of FIG. 5). It should be noted that all data packets bridged on the wide area network must be transmitted with their delivery confirmation bit (D-bit) off. End-to-end delivery confirmation by the source processor 110 is provided via the overlaying local area network protocol.

B. The Wide Area Network Interface

The second interface termination of this invention to be discussed is the wide area network interface termination. Preferably, the wide area network interface with bridging apparatus 200 links WAN-arranged data for transfer either directly into the wide area network or directly to a second bridging apparatus. The bridging apparatus interface is preferably compliant with the 1984 CCITT wide area network specification to support up to a 56 Kb/sec data rate.

A set of parameters for bridging apparatus 200 which resemble OSI model second-layer parameters are listed in Table 1 below. The second layer is mode-switch (232 in FIG. 3) configurable as either data terminal equipment (DTE) or data communication equipment (DCE) operation, allowing point-to-point bridging apparatus connections. It should be noted that each source processor will preferably function as a DTE to the wide area network relative its operation resembling layer 1 of the OSI model. The state of the mode switch is examined by microprocessor 230 after entry of each user command while the bridging apparatus is functioning as a control port, or after termination of an I/O session while the bridging apparatus is functioning as a gateway for data across the wide area network.

TABLE 1

| Parameter | Value (bits) |
| --- | --- |
| K (window size) | 7 |
| N2 (max transmission) | 7 |
| T1 (acknowledgement timeout) | 3 |

The state of mode switch 232 corresponds to the value of input bit 0x04 on USART 212 contained therein. Data received via port P2 are transmitted across the specified medium. When functioning as data terminal equipment, the wide area network layer 2 parameters provide four (4) logical channels which function as switching virtual circuits (SVCs). The SVC channels are activated upon receipt from the wide area network of a call request packet. SVC channels transfer data defining incoming call acceptance and outgoing call origination. The wide area network address provisioning and SVC call security are managed by a wide area network controller (not shown), well known in the art of wide area network communication. During SVC call setup, it is preferred that the wide area network controller provide options for a closed user group for negotiating data throughput, for negotiating data flow control, for performing a "reverse charging" data function and for performing a task of redirecting call notification.

The wide area network layer 3 parameters for each logical channel are specified in Table 2 below. The parameters, other than the layer 3 packet and window size parameters for the SVC channels, are preferably provisioned by the wide area network controller.

TABLE 2

| Bridging Apparatus Layer 3 Parameters | |
| --- | --- |
| Parameter | Value |
| W (Window Size) | 7 bits |
| P (Packet size) | 1024 octets |
| T20 (restart timeout) | 10 secs |
| T21 (call timeout) | 20 secs |
| T22 (reset timeout) | 10 secs |
| T23 (clear timeout) | 10 secs |
| T25 (data timeout) | 20 secs |
| T26 (interrupt timeout) | 10 secs |
| R20 (restart retries) | 10 cycles |
| R22 (restart retries) | 2 cycles |
| R23 (clear retries) | 2 cycles |

Local area network protocol provides data delivery confirmation periodically. For example, once per minute, microprocessor 230 may poll the wide area network using "interrupt" data packets. A failure to receive polling confirmation data from the wide area network within T26 seconds causes the microprocessor to implement the bridging apparatus' channel recovery procedures, i.e., reset. Interrupt polling insures that data transfer initiation calls are discontinued if end-to-end connections are determined to be broken.

When the bridging apparatus receives a data packet addressed to 0x7 C, the 802.2 DSAP, the data included therein are processed locally within the apparatus. All other addressed data packets are transferred across the WAN/LAN interface to the local area network. Any unrecoverable layer 1, 2 or 3 protocol (i.e., failure) triggers a function within the bridging apparatus, forcing activation of apparatus restart procedures. The microprocessor 230 responds by passing control to and back from the reset command until the condition inducing the protocol failure clears.

As with the local area network interface, the bridging apparatus/WAN interface is switch configurable. When the interface is switch enabled, the bridging apparatus initiates functions which attempts to establish layer 1, 2 or 3 data communications autonomously. If the DTE/DCE configuration switch is off, corresponding to the value of input bit 0x20 on USART 212, no communication within wide area network is attempted.

C. Asynchronous Interface

Asynchronous interface operation in which the bridging apparatus 200 terminates a single asynchronous interface will now be described. The asynchronous interface may be used both as a local control port (e.g., port P3) for the bridging apparatus and as an asynchronous gateway to either the local area network or wide area network. The interface definition is configured by switch 232. When the asynchronous interface is configured as asynchronous gateway, data are preferably routed across the apparatus/WAN interface. If the apparatus/WAN interface is switch-disabled, data are routed across the apparatus local area network interface. The mode switch 232 is examined by the apparatus' microprocessor 230 after each user command is initiated during the time at which the apparatus is functioning as a control port, or after termination of a data transfer while the apparatus is functioning as a gateway. The node switch corresponds to the value of input bit 0x08 of USART 214.

When the apparatus is configured (by mode switch 232) asynchronously, the asynchronous port P3 implements a gateway to either the local area network or wide area network for character transmission. Data are encapsulated in the data format common to the target processor and addressed to the target address (e.g., DSAP=0x78). Data received at the asynchronous port from either the wide area network or local area network (local area network DSAP=0x7 A; wide area network DSAP=0x7 C) are displayed over the port P3 in all available operational modes.

A variety of local control port commands may be generated by the microprocessor within the bridging apparatus and transferred over the local control port from/to a data terminal or processor attached to the apparatus. A wide area network call initiation command initiates a wide area network call to a specified address. A wide area network link restart command triggers a wide area network layer three restart. A wide area network status command causes a display of the status of all wide area network channels, indicating whether the apparatus is configured as data terminal equipment or data communication equipment. A wide area network packet monitor command enables and disables wide area network packet monitoring. A wide area network raw transmit command transmits a specified packet (entered as a series of hexadecimal bytes) over the wide area network interface. A wide area network gateway command initiates an asynchronous gateway session across the wide area network interface. A mechanism is also included within the bridging apparatus to terminate the session and return to the command entry mode.

Local control port commands also include a local area network packet monitor command to enable and disable local area network packet monitoring. When local area network packet monitoring is enabled, any received local area network packet is displayed in raw mode across the asynchronous interface. A local area network raw transmit command transmits a specified packet over the local area network interface. A local area network gateway command initiates an asynchronous gateway session across the local area network interface. A mechanism is also provided to terminate the session and return control to command entry mode. A baud rate command changes the baud rate for the interface. Speeds of 300, 1200, 2400, 4800, 9600 and 19,200 bits/sec. are supported. The preferred baud rate is 9600 bits/sec. A character echo command enables/disables input character echo across the interface. A manual reset command resets the bridging apparatus. Finally, the control port directs autonomous messages for output across the asynchronous interface for each of the following events: bridging apparatus startup, SVC circuit establishment, detection of unrecoverable wide area network protocol failure, detection of on-board hardware failure and processor initiation.

The functionality of the bridging apparatus 200 of this invention resides in a set of instructions, preferably, stored as firmware and carried out by the microprocessor 230. However, the first 1 MB of RAM contained within each apparatus is reserved for downloading alternative software. The download/upload can be effected either over the local area network interface (DSAP=0x7a) or the wide area network interface (DSAP=0x7c).

Following completion of a system reset, the bridging apparatus 200 performs an integrity verification of the resident firmware by a computation of a ROM checksum. A complete RAM diagnostic test is executed at this time as well. If the ROM or RAM tests fail, the bridging apparatus will park, i.e., the apparatus will remain in the reset state without moving into operational mode. A failure LED on the bridging apparatus is activated under hardware control on initiation of a system reset. The LED is deactivated under firmware control following completion of the reset and successful execution of startup diagnostics. An autonomous reset of the bridging apparatus may be initiated by the firmware on detection of a predefined event such as: device failure, processor exception (e.g., bus/address error) or unrecoverable wide area network protocol failure.

D. System Embodying Apparatus Described Herein

A system embodying the apparatus of this invention will now be described with reference to FIG. 5. A LAN-resident source processor 110 is shown therein electrically connected to a first bridging apparatus 120 at a remote (central) location. The first bridging apparatus 120 terminates LAN-arranged data launched from the source processor for transfer into a node of a wide area network 125. The bridging apparatus 120 interprets and transforms wide area network and local area network protocol such that the wide area network appears as terminating equipment to the source processor 110.

Figure 5:
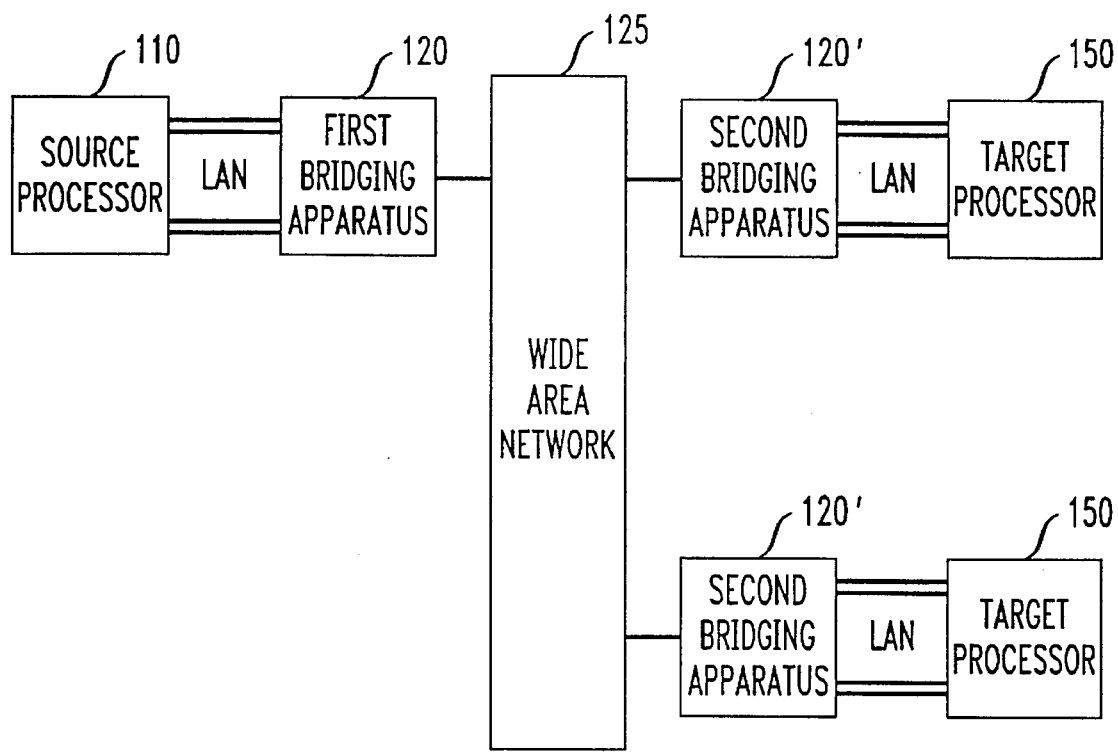
FIG. 5 is a schematic block diagram of a system formed in accordance with the present invention.

A second bridging apparatus identified as bridging apparatus 120' in FIG. 5 terminates another node of the wide area network. Bridging apparatus 120' is also linked to the local area network within which a target processor 150 is resident. The local area networks are preferably 1 Mb local area networks. While this description identifies only a second bridging apparatus 120' and a single target processor 150, the source processor 110 is capable of servicing numerous target processors located at different nodes within the wide area network, though at most one target processor can be communicated with at one time. The system embodying bridging apparatus 120 and 120' is especially useful when numerous target processors are distributed over a wide geographic area (such as might be the case with a national or international company). The bridging apparatus of this invention therefore allows one remotely located source processor to bridge the wide area network to communicate with each of a plurality of target processors while preserving the local area network link.

E. Firmware Definition

Each bridging apparatus 200 of this invention includes a ROM (such as ROM 234 shown in FIG. 3) containing a set of microprocessor instructions for performing the above-described commands. As ROM-based firmware, the instructions are carried out by the microprocessor 230 as a series of processes or functions. A list of several processes relevant to operation of an the system-based LAN is provided as Table 3.

TABLE 3

| Bridging apparatus Processes | |
|---|---|
| Process | Function |
| CMrxlan | local area network receiver |
| XU | wide area network Upper Layer |
| XL | wide area network Lower Layer |
| BT | Boot |
| WD | Watch Demon |
| COidle | Idle |
| Coispx | Notification of spurious interrupts |
| Root | VM initialization and TTY utility |

CMrxlan is the local area network receiver process that initializes a local area network controller (not shown in the figures) on startups. The process is preferably implemented as a skeleton of the local area network receiver process in the target processor 150. The CMrxlan process routes received data packets to other processes. A particular operational flow defining the CMrxlan process is

```
IF      (DSAP = = Ox7A)
        /* control packet */
        send packet to BT process
ELSE
        /* ordinary packet */
        send packet to XU process
IF      (local area network watch enabled)
        send packet to WD process
```

Within any communication management scheme, data packets are logically addressed using the 802.2 service point address (SAP) fields within a data packet header. The physical (802.3) address corresponding to the logical (802.2) SAP is determined at run-time using simple address-resolution protocol. Each communication manager node maintains a table to map each 802.2 SAP value to an associated 802.3 address. At initialization, all table values are defaulted to the broadcast address to send initial data transmission to an SAP at all nodes on the local area network. Thereafter, the 802.3 source address corresponding to the 802.2 SAP is saved by CMrxlan within an AddrMap table. Whenever a packet is thereafter transmitted by the bridging apparatus 300 over the local area network, the table is examined to extract the proper physical address. When the destination SAP acknowledges a transmission, the originating node saves the 802.3 address resident in the acknowledgment protocol using the same for subsequent SAP transmissions.

Communication manager nodes use the same protocol for communicating across the local area network or the bridging apparatus. During bridging apparatus access, the source processor 110 connected to one end of the bridge associates all SAPs with physical address 0x000000000078 (adapted by the local bridging apparatus). The far end of the bridging apparatus maintains the true physical address associated with each SAP in order that data packets are routed to proper nodes.

The XU process is the wide area network upper layer process. The XU process receives data packets from CMrxlan (in one direction) and passes the packets to the XL (wide area network lower layer) process. In the other direction, the XU process receives data packets from XL process and directs the packets to the local area network. The XU process includes several subfunctions, such as XUlanrcv, which processes packets forwarded from the CMrxlan, Root or BT processes for subsequent delivery to the XL process. The XU places the packets in a transmit queue for subsequent delivery to the XL process. Also, XUutrcv is a process to control requests from the ROOT process, such as a wide area network layer 3 unit or an SVC call, both forwarded by the XUutrcv process to the XL process. An operational flow defining XUcmdrcv process is:

```
        IF      (DSAP = = Ox7C)
                /* control packet */
                send packet to BT process
        ELSE
                /* ordinary packet/
                transmit packet across local area network
        IF      (WAN watch-enabled)
                send packet to WD process.
```

XL is a process which implements level 3 of the wide area network, manages interaction with the wide area network layer 2 evaluation and exchanges connection and data packets with the XU process.

BT is the bridging apparatus boot process, responsible for control apparatus requests sent via the local area network or wide area network. Several requests are highlighted in Table 4. The BT process forwards an acknowledgement (ACK) to the originating source for each of the requests defined in Table 4.

TABLE 4

| Message | Function |
|---|---|
| IO | display ASCII string over asynchronous port |
| DOWNLOAD | copy supplied bytes to specified location in memory |
| EXEC | transfer exectution to indicated address |
| UPLOADREQ | solicit UPLOADRSP containing image of specified location in Memory |
| ENQ | enquire state of bridging apparatus |

WD (listed in Table 3) is a watch demon process. The WD process receives data packets forwarded from the local area network or wide area networkwhen monitoring is enabled for either interface. The first 40 bytes of any received data are then transferred over the asynchronous port.

COispx is a process that receives notification of spurious interrupts or exceptions and displays a pertinent debugging message across the asynchronous port. COidle is a process that executes a while or "idle" processing loop.

ROOT is a process that completes initialization of the run-time environment. For example, ROOT turns off the bridging apparatus 300 failure LED, creates mailboxes, initializes a bridging apparatus database and spawns additional processes. After performing its initialization chores, ROOT acts as an agent to manage command data transfer, and execution over the asynchronous port. An operational flow of Root processing is:

```
DO forever:
        IF      (monitor strap on)
                Start local area network data transfer session
        ELSE
                Start WAN I/O session
        ELSE
                read and execute input command.
```

LAN/WAN data transfer sessions include reading characters from the asynchronous link and forwarding these characters within boot data packets over the proper interface. Several ROOT processed asynchronous link commands are listed in Table 5 below.

TABLE 5

| Command | Effect |
|---|---|
| lwatch [on/off] | Enables (arg = "on") or disables (arg = "off") local area network packet tracing, If no argument is supplied, displays the current local area network packet trace state. |
| lraw <hex-bytes> | Transmits the hexadecimal byte string over the local area network. |
| lanio | Initiates a local area network data transfer session. The session is terminated by entering a '.' as the first character on a line. |
| xwatch [on l off] | Enables (arg = "on") or disables (arg = "off") wide area network packet tracing. If no argument is supplied, displays the current wide area network packet trace state. |
| xraw <hex-bytes> | Transmits the hexadecimal byte string over each active wide area network circuit |
| x25io | Initiates a wide area network data transfer session. The session is terminated by entering a '.' as the first character on a line. |
| xstat | Displays wide area network status. The report indicates whether the wide area network link is configured as a data terminal equipment or data circuit terminating equipment, then lists the state of each logical channel, the address of any remote data terminal equipment which is connected, and the window and packet size used for the connection. |
| xcall <address> | Requests initiation of a wide area network circuit to the specified data terminal equipment. Successful establishment of the circuit is indicated by an autonomous "CONNECT" response. |
| xinit | Triggers a Level 3 restart of wide area network. This tears down any active wide area network circuit. |
| date [hh:mm:ss mm/dd/tt] | Resets the date stamp on the bridging apparatus as indicated by the supplied argument data (or portion thereof), then displays the resulting date string. Time bridging apparatus. |
| echo [onloff] | Enables (arg = "on" or absent) or diables (arg = "off") character echo over the asynchronous interface. |

TABLE 5-continued

| Command | Effect |
| --- | --- |
| baud <rate> | Sets the speed for the interface to the specified rate, The rate value may be any of the following: 3, 12, 24, 48, 96, 192, 300, 1200, 2400, 4800, 9600, 19200. |
| probe <command> | Passes the supplied command to the system for exectution and displays the response. Multiple inputs can be passed to the system by separating components by 'l' within the command. |
| reset | Triggers a reset microprocessor. |
| version | Displays the firmware version id. |
| help|? | Displays a command summary. |

Figure 6:
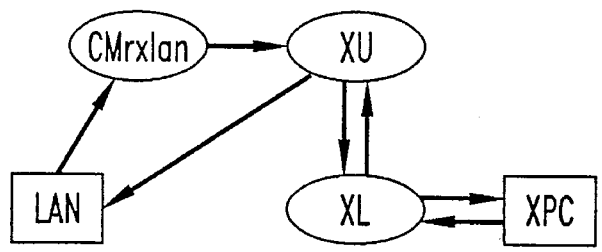
FIGS. 6, 7, 8 and 9 are processing flow diagrams of several processing functions carried out by apparatus the of this invention.

Bridging operation is described in FIG. 6. When data are bridged from local area network to the wide area network, the CMrxlan process invokes a COforward function. The COforward function routes the received packets to the XU process. When data are bridged from the wide area network to the local area network, the XU process invokes a CMforward process. The CMforward process transmits the incoming data packet onto the local area network directly, utilizing no intermediate local area network process.

Figure 7:
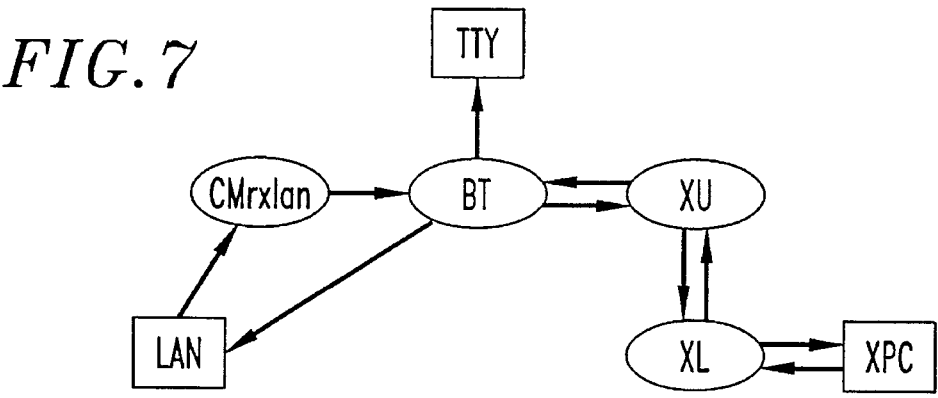

FIG. 7 is a flow diagram depicting the boot processing flow (BT). Boot related messages are received by either the CMrxlan or XU processes. When a boot (BT) data packet arrives, the boot receiving process invokes the COforward process to route the packet to the BT process. Boot related acknowledgments emanate from the BT process and are directed to either the XU process via the COforward process, or transmitted directly over the local area network via CMforward process.

Figure 8:
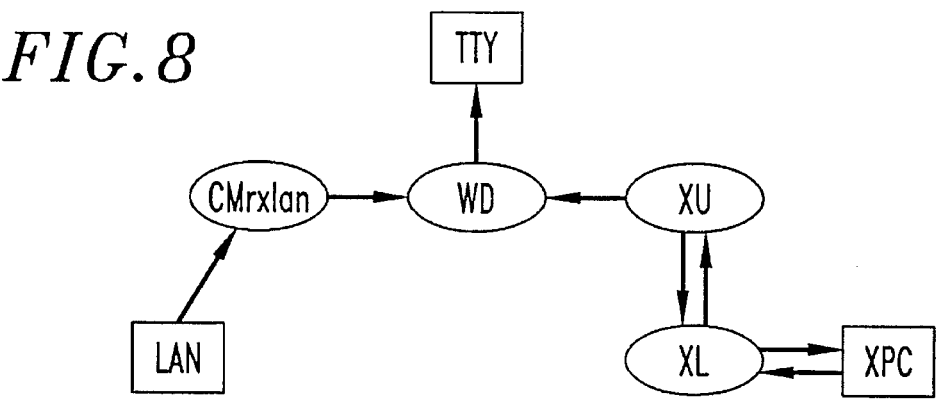

Data packet tracing may be activated independently by both the local area network and wide area network interface. Data packet tracing flow is illustrated in FIG. 8. The CMrxlan and XU receiving processes may both be invoked. In addition, based on the particular packet trace that is enabled, the receiving process may invoke the COforward process to furnish a copy of the packet to the WD process.

Figure 9:
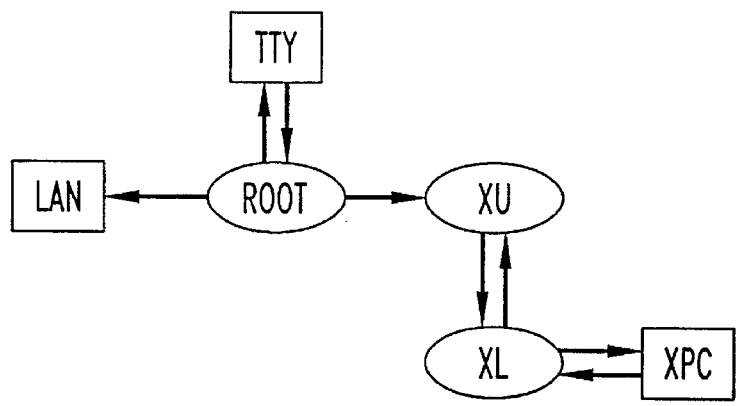

Several utility commands processed by ROOT process trigger messages to other processes. The processes are summarized in Table 6, the processing flow of which is depicted in FIG. 9.

TABLE 6

| | |
| --- | --- |
| lraw | ROOT process invokes the CMforward process to transmit data packets on the local area network |
| lanio: | ROOT process invokes BTsendio→BTsending→CMforward to transmit a data packet on the local area network |
| xraw: | ROOT process invokes the COforward process to transmit data packets to the XU process |
| x25io: | ROOT process invokes BTsendio→BTsendmsg→COforward to transmit a data packet to the XU process |
| xinit: | ROOT process invokes the COforward process to transmit a data control pcket to the XU process |
| xcall: | ROOT process invokes COforward process to transmit a data control packet to the XU process |

Local area network interrupts are communicated from the ISR to the CMrxlan process via a system message. Wide area network interrupts are conveyed to the XL process through a signal. TTY (asynchronous) interrupts (port input) are buffered within the drivers 216, 218 (shown in FIG. 3) and are conveyed to a user process (via a system message) during that time at which the process is waiting for the completion of a read or write request. The processing priorities are listed in Table 7:

TABLE 7

| | |
| --- | --- |
| Highest: | CMrxlan |
| | COispx |
| | XL |
| | XU |
| | ROOT, BT |
| | WD |
| Lowest: | COidle |

In addition, local area network data transfer typically takes precedence over wide area network data transfer. Wide area network data transfer takes precedence over TTY data transfer, dictated by the relative speeds of the interfaces.

The ROM present within each bridging apparatus 220 stores 60 kB for the existing bridging apparatus load, 34 KB by the system and its accompanying drivers. Preferably, the ROM is a 128 KB ROM. The bridging apparatus is preferably equipped with 4 MB of RAM; 1 MB of RAM is reserved for software download which leaves 3 MB for use at run-time.

The bss segment is further segmented as follows: XU transmit/receive buffer (1 MB), XL XPC receive buffer (64 packets at 66 KB), local area network receive buffer (36 packets at 40 KB) and TTY receive buffer (two channels at 8 KB).

Several common functions are provided by the apparatus. A common function CMforward transmits a specified data packet across the local area network. An operational flow of CMforward is:

```
IF      (DSAP = = OxFF)
        /* logical broadcast */
        physical address = OxFFFFFFFFFFFF
ELSE IF (DSAP & 1)
        /* logical multicast */
        physical address = DSAP
ELSE
        /* use last reported address from AddrMap */
        physcial address - AddMap [DSAP/2]
```

A common function BTsendmsg provides reliable transmission of boot packets to a peer boot entity across the local area network or wide area network interface. COforward is a function for passing data packets among the bridging apparatus processes. The function provides means to bypass VM restriction (32 KB maximum) on mailbox size by first allocating a dynamic memory buffer for the packet and then sending, via COsendit, a message containing the address of the allocated segment to the indicated mailbox.

A COstartup function performs a number of apparatus or system startup steps. The function enters supervision mode, masks interrupts and sets the initial base register, masks USARTS and resets the local area network controller. The function also performs the ROM checksum, diagnoses the first 4 KB of RAM for use as a temporary stock and the remaining 4 MB of RAM via a RAM diagnosis function. The function also enables RAM parity error detection, relocates the vector table from ROM to RAM, constricts system configuration tables and jumps to a system routine or process.

What has been described herein is merely illustrative of the application of the principles of the present invention. For example, the functions described above and implemented as the best node for operating the present invention are for illustration purposes only. Other arrangements and methods may be implemented by those skilled in the art without departing from the scope and spirit of this invention.

What is claimed is:

1. A bridging apparatus for bridging data arriving at an interface between first and second non-compatible communication networks, comprising:
   a) a processor for processing said data arriving at said bridging apparatus in accordance with a set of processing instructions;
   b) a memory in communication with said processor within which said set of processing instructions is stored;
   c) a first port for transferring said data to/from a node of said first communication network in accordance with said processing instructions;
   d) a second port for transferring said data to/from a node of said second communication network in accordance with said processing instructions;
   e) a third port connected to one of the first and second non-compatible communication networks for asynchronously transferring said data to/from one of the first and second ports for transferring data to the communication network connected thereto in accordance with said processing instructions; and
   f) a mode switch for controlling the transfer of data from the third port to one of the first and second ports.

2. The bridging apparatus of claim 1, further including a configuration switch for configuring the bridging apparatus as either a data terminal equipment (DTE) or a data communication equipment (DCE).

3. The bridging apparatus of claim 1, wherein said data arrive at said first port of said bridging apparatus and are processed for compatible transfer to/from one of said second and third ports.

4. The bridging apparatus of claim 1, wherein said data arrive at said second port of said bridging apparatus and are processed for compatible transfer to/from one of said first and third ports.

5. The bridging apparatus of claim 1, wherein said data arrive at the third port of said bridging apparatus and are processed for compatible transfer to/from one of said first and second ports.

6. The bridging apparatus of claim 1, wherein said first non-compatible communication network is a local area network.

7. The bridging apparatus of claim 1, wherein said second non-compatible communication network is a wide area network.

8. The bridging apparatus of claim 1, wherein said data must include one of a broadcast address associated with the second non-compatible communication network and a source processor address to enable capture of said data by said bridging apparatus.

9. The bridging apparatus of claim 8, wherein said data must include a destination service access point address to enable processing of said data by said bridging apparatus.

10. A system comprising:
    first and second bridging apparatus for facilitating communication between a source processing terminal and a target processing terminal across a communication network that is not compatible with said terminals, each of the first and second bridging apparatus including:
       means for asynchronously transferring data between the first and second bridging apparatus; and
       a mode switch for controlling the routing of the asynchronous transferring of data to predetermined ports;
    wherein said source and target processing terminals are connected, respectively, to said first and second bridging apparatus, such that said first bridging apparatus transfers data between said source processing terminal and said communication network and said second bridging apparatus transfers data between said communication network and said target processing terminal for facilitating packet assembler/disassembler and communication network bridging functionality.

11. The system of claim 10, wherein each of said first and second bridging apparatus includes means for terminating one of:
    a) a wide area network connection to a wide area network (WAN);
    b) a local area network connection to a local area network (LAN); and
    c) a single asynchronous connection, said single asynchronous connection for use as one of:
       i) an asynchronous interface control port;
       ii) an asynchronous gateway to the LAN; and
       iii) an asynchronous gateway to the WAN.

12. The system of claim 11, wherein each of said first and second bridging apparatus further includes means for coupling data to/from an asynchronous apparatus attached to the respective bridging apparatus via the single asynchronous connection.

13. The system of claim 11, wherein said communication network includes the WAN.

14. The system of claim 13, wherein the WAN operates according to an CCITT standard protocol.

15. The system of claim 10, wherein said source and target processing terminals are resident within local area networks connected to the communication network such that data are transferred from/to said first and second bridging apparatus to/from said source processing terminal and to/from said target processing terminal via said local area networks.

16. The system of claim 15, wherein each of said local area networks operates an IEEE 802.3 Carrier Sense Multiple Access with Collision Detection (CSMA/CD) protocol.

17. The system of claim 10, wherein the source processing terminal includes a flexible control architecture which renders the source processing terminal extendable and remotable.

18. The system of claim 10, wherein each of said first and second bridging apparatus further includes a processor and a memory, and wherein said memory stores a set of instructions for execution by said processor to implement said bridging functionality.

19. The system of claim 10, wherein said source processing terminal includes means for analyzing and diagnosing systems processing operation of said target processing terminal.

20. The system of claim 19, wherein said source terminal is a general purpose computer and said target terminal is telecommunications equipment.

21. A communication apparatus comprising:
    a network interface including:
       a local area network (LAN) universal synchronous/asynchronous receiver/transmitter (USART) for interfacing with a LAN; and
       a wide area network (WAN) USART for interfacing with a WAN;
       an asynchronous USART for asynchronously interfacing with either the LAN or the WAN; and
       a mode switch for controlling the interfacing of the asynchronous USART with one of the LAN or the WAN; and means, connected to the network interface, for adjusting protocol differences within data streams passing through the network interface between one of:
  (1) a first processing terminal and a node of the wide area network circuit;
  (2) an asynchronous processing terminal and the node of said wide area network circuit; and
  (3) the asynchronous terminal and said first processing terminal.

22. The communication apparatus of claim 21, wherein said means for adjusting includes a microprocessor and a memory, said memory including a set of microprocessor instructions for operating the microprocessor to control the means for adjusting.

23. The communication apparatus of claim 21, wherein said first processing terminal is resident within a local area network; and
  wherein the adjusting means reconciles protocol differences between said local area network and one of: (1) said wide area network and (2) said asynchronous terminal.

24. An apparatus for bridging data arriving at an interface between incompatible communication networks, comprising:
  a) a processor for receiving and processing the data;
  b) a plurality of level converters, including first, second, and third level converters, for converting data signal levels of the received data to converted signal levels for processing by the processor;
  c) a plurality of universal synchronous/asynchronous receiver/transmitters (USARTs) for interfacing with the first and second incompatible communication networks, including:
    a first USART for interfacing with a local area network (LAN) of the incompatible communication networks through the first level converter;
    a second USART for interfacing with a wide area network (WAN) of the incompatible communication networks through the second level converter; and
    a third USART for asynchronously interfacing with either the LAN or the WAN for transferring the received data between incompatible communication networks.

25. The apparatus of claim 24 further including:
  d) a mode switch for controlling the transfer of the received data from the third USART to one of the first USART and the second USART.

* * * * *